US005526660A

United States Patent [19]

Bennett et al.

[11] Patent Number: 5,526,660

[45] Date of Patent: Jun. 18, 1996

[54] MULTI-POINT T-HANDLE LATCH ASSEMBLY

[75] Inventors: Cameron L. Bennett, Cleveland; Donald J. McFarland, Parma, both of Ohio

[73] Assignee: Cleveland Hardware & Forging, Cleveland, Ohio

[21] Appl. No.: 213,160

[22] Filed: Mar. 15, 1994

[51] Int. Cl.$^{6}$ ...................................................... B60R 25/02

[52] U.S. Cl. ........................... 70/208; 70/210; 292/336.3; 292/359

[58] Field of Search .................... 70/208–211; 292/336.3

[56] References Cited

U.S. PATENT DOCUMENTS 3,089,329 5/1963 Kerr ........................................ 70/208

4,706,478 11/1987 Swan et al. .............................. 70/208

*Primary Examiner*—Steven N. Meyers

*Assistant Examiner*—Tuyet-Phuong Pham

*Attorney, Agent, or Firm*—Calfee Halter & Griswold

[57] ABSTRACT

A locking rotary latch assembly has a shank bearing about the shank on the exterior side of a latch housing, and an interior load bearing bushing about the shank on the interior side of the latch housing which also intersects and guides a sliding locking arm. A latching arm is mounted on the end of the shank against the load bearing bushing which includes a portion that is in contact with the housing adjacent the exterior shank bearing so that forces applied to the shank are resisted by the combination of the load bearing bushing, and the exterior shank bearing against the portion of the load bearing bushing in contact with the housing. The exterior shank bearing prevents passage of the shank from the exterior to the interior side of the housing.

15 Claims, 6 Drawing Sheets

MULTI-POINT T-HANDLE LATCH ASSEMBLY

FIELD OF THE INVENTION

The present invention relates generally to latches for latching doors and the like, in particular, to handle operated rotary latches with locking mechanisms.

BACKGROUND OF THE INVENTION

Rotary action latches which have a latching arm operated by handle rotation of a shaft are commonly used as closing mechanisms for doors in applications such as metal cabinets and truck bodies. A shaft of the latch is positioned to intersect a latch mounting body, with a handle attached to the shaft on an exterior side of the body, and the latching arm attached to the shaft on an interior side of the body. The shaft is typically supported in such a position by intersection with a bracket welded to the interior side of the body. Locking rotary latches typically use a key cylinder operated locking slide intersected by the shaft to prevent rotation of the shaft when a flat-sided opening of the locking slide is advanced to be adjacent to a flat-sided section of the shaft. The locking slide is commonly secured to and guided against the interior of the body by a bracket welded to the body over the slide. The body is attached directly to a door.

In latches of this type, the structural integrity and maximum strength of the latch is highly dependent upon the strength of the brackets which secure the shaft and the locking slide to the body. For example, linear and moment forces applied to the shaft, such as applied by the latch arm to the shaft when a latched door is pried, tend to displace the axis of the shaft away from perpendicular intersection with the housing, causing the latch to deflect. A force sufficient to draw the shaft through the housing will of course result in failure of the latch. Torquing forces applied to the shaft through the handle apply moment forces to the locking slide which is resisted at the points of attachment of the brackets which secure the locking slide to the body.

Cleveland Hardware and Forging Company Single Point T-Handle Latch Model Nos. 9001 and 9002 utilize a shaft receiving bracket welded to the interior of the body which supports the end of the shaft on the interior of the body. U.S. Pat. No. 4,706,478 discloses a locking rotary latch which uses several brackets welded to the interior wall of the body, one of which is intersected by the shaft and serves as a guide channel for a locking slide. The use of such brackets in connection with the shaft, latching arm, locking mechanism and mounting body complicates design and assembly, blemishes the exterior of the body where welded, and adds significantly to production cost. Furthermore, the presence of a shaft mounting bracket on the interior side of the body increases the internal dimensional profile of the latch, taking up interior space and requiring a thicker door profile, and limits the radial range of remote latch control rods connected to the latch.

SUMMARY OF THE INVENTION

The present invention provides a rotating lockable latch assembly for closure of doors and the like which uses a load bearing bushing and a shank bearing about a shank where the shank intersects a latch housing to resist and distribute forces applied to the shank by the latching arm or the shank handle. The load bearing bushing secures the locking slide of the latch to the interior side of the latch housing, and guides linear movement of the locking slide. The assembly of the load bearing bushing on the shank on the interior side of the housing opposed to the shank bearing on the exterior side of the housing provides excellent structural strength and resistance to axial and moment forces applied to the shank.

In accordance with one aspect of the invention, a latch assembly is provided which includes a latch housing having an exterior and an interior side, a rotatable shank which intersects the housing, a handle attached to the shank on the exterior side of the housing, a latch attached to the shank on the interior side of the housing, a load bearing bushing about the shank on the interior side of the housing, a locking slide having an opening through which the shank passes, and the locking slide positioned between a portion of the load bearing bushing and the interior side of the housing.

In accordance with another aspect of the invention, a latch includes a mountable latch housing having an exterior and an interior side, a shank which intersects the latch housing, a handle attached to an end of the shank on the exterior side of the latch housing, a latching arm attached to the shank on the interior side of the latch housing, a bushing about the shank and in contact with the interior side of the latch housing, and a shank bearing about the shank and in contact with the exterior side of the housing, the shank having a flange which overlaps the shank bearing on the exterior side of the housing, whereby contact of the flange with the shank bearing prevents passage of a portion of the shank on the exterior side of the housing to the interior side of the housing.

In accordance with another aspect of the invention, a load bearing bushing is disclosed for use in a latch assembly having a locking mechanism wherein the locking mechanism includes a lock slide having an oblong opening, the bushing having a bore for receiving a shank of the latch assembly and a first substantially planar surface perpendicular to an axis of the bore for parallel alignment with a portion of a latch attached to the shank, a second substantially planar surface parallel to and spaced from the first surface, legs extending perpendicular from the second surface a distance at least equal to a thickness of the lock slide, the legs having a width less than a width of the second surface and adapted to intersect the oblong opening of the lock slide, with distal ends of the legs adapted to be supported by a portion of the latch assembly, whereby the lock slide is retained in the latch assembly between the second surface and the portion of the latch assembly supporting the load bearing bushing.

To the accomplishment of the foregoing and related ends, the invention then comprises the features hereinafter fully described and particularly pointed out in the following detailed description made with reference to the annexed drawings which set forth in detail certain illustrative embodiments of the invention, these being indicative, however, of but some of the various ways in which the invention may be employed.

BRIEF DESCRIPTION OF THE DRAWINGS In the annexed drawings.

DETAILED DESCRIPTION OF PREFERRED EMBODIMENTS

Figure 1:
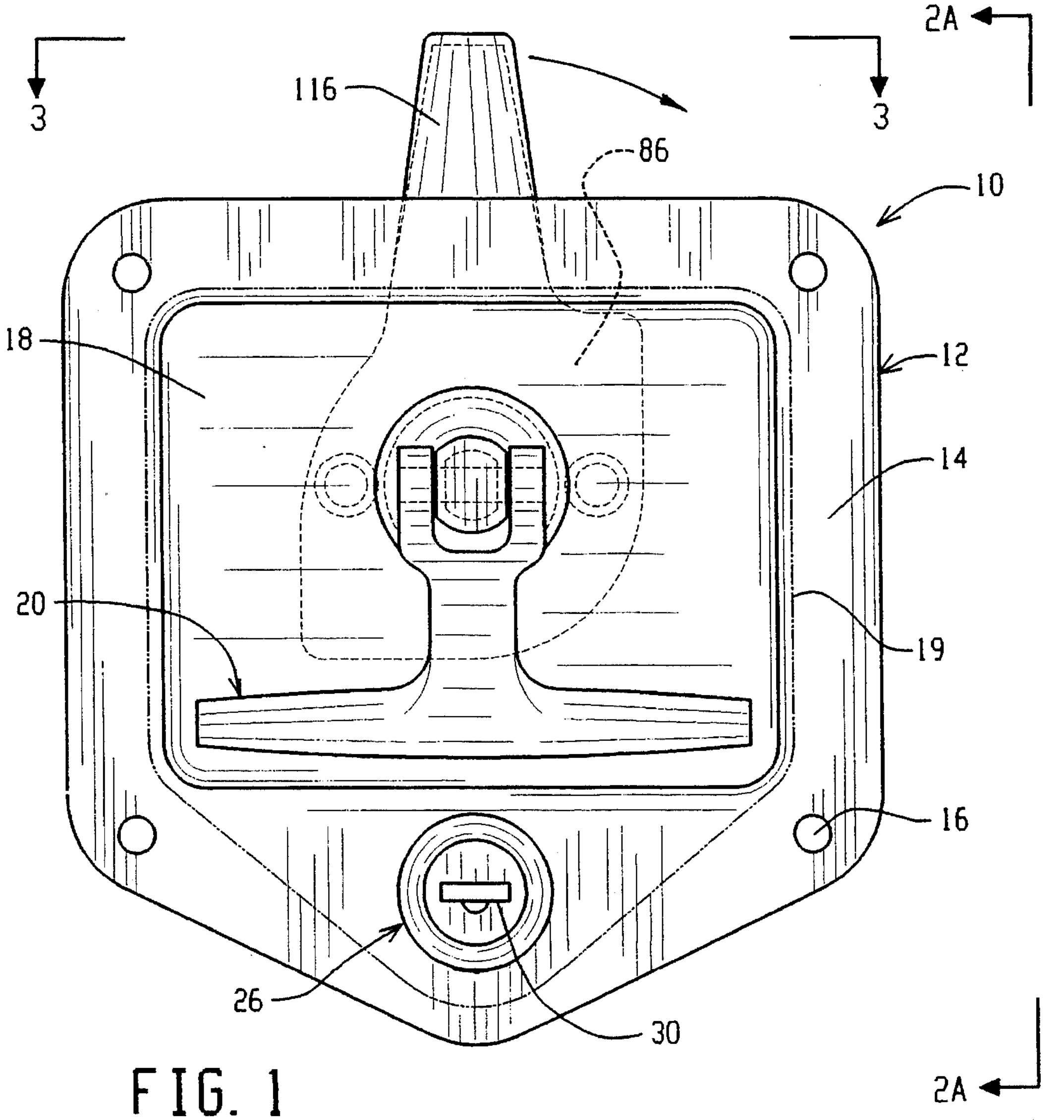
FIG. 1 is a plan view of a latch assembly of the present invention.
Figure 3:
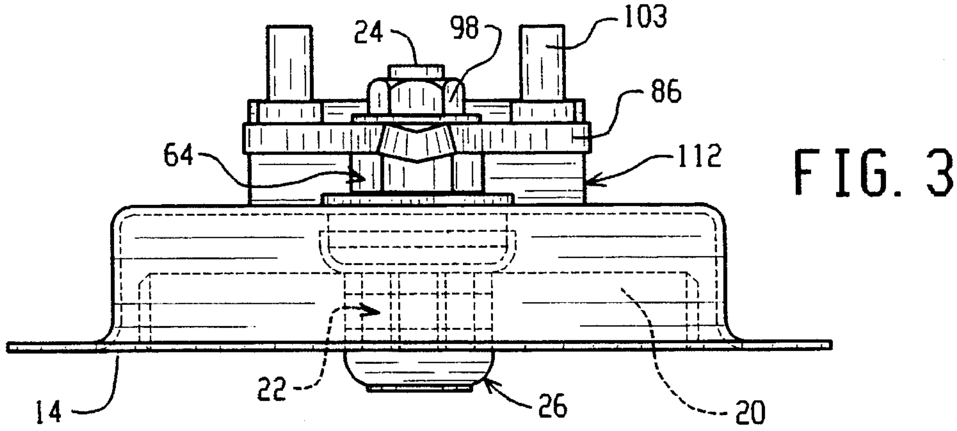
FIG. 3 is a side view of the latch assembly of the present invention, taken in the direction of the arrows 3—3 in FIG. 1.
Figure 2B:
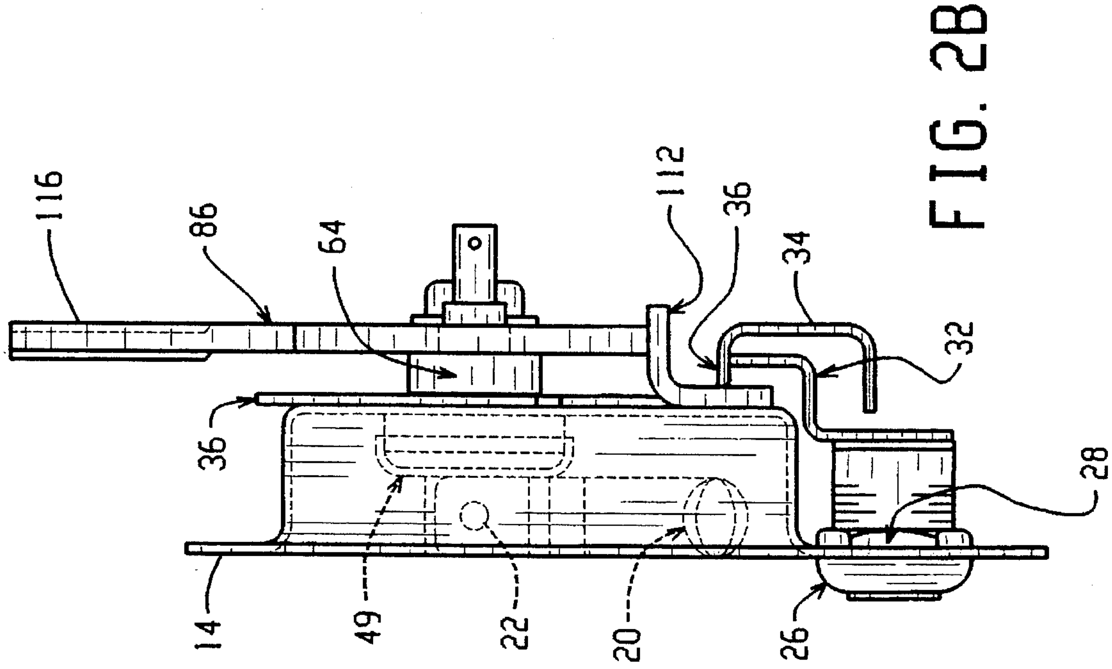
FIG. 2B is a variation of FIG. 2A showing the lock slide in a fully locked position.
Figure 2A:
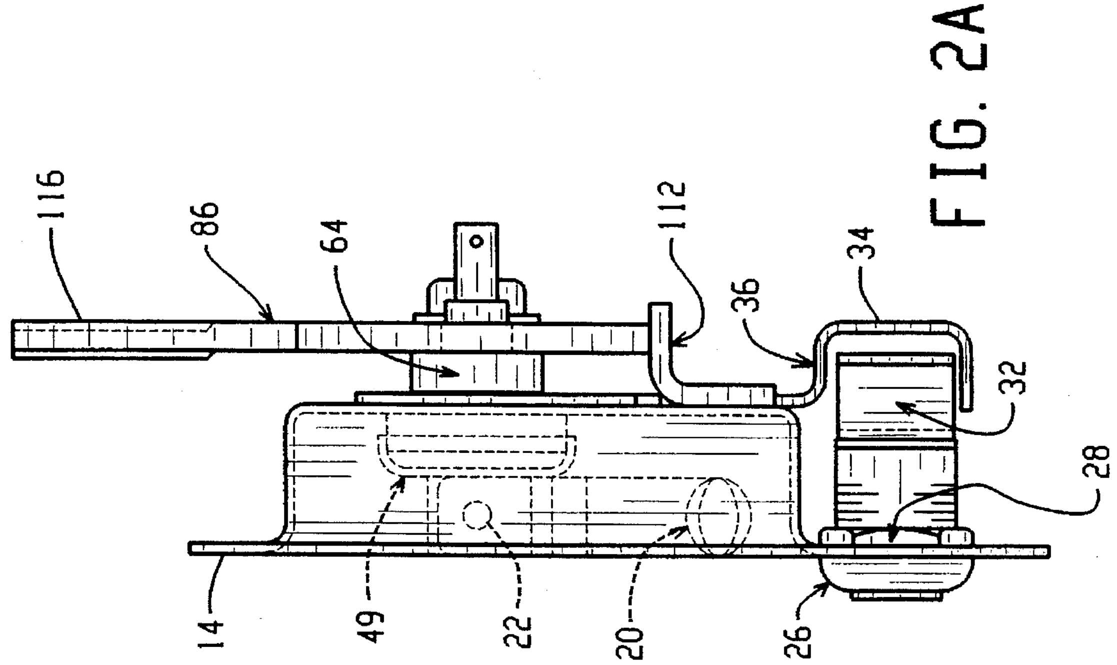
FIG. 2A is an end view of a latch assembly of the present invention taken in the direction of the arrows 2A—2A in FIG. 1.

With reference to FIGS. 1–4, there is illustrated a latch assembly, indicated generally at 10, which includes a latch housing 12 of a generally rectangular shape, having a peripheral flange 14, adapted to be flush mounted to a door (for example by fasteners through fastener holes 16), t and an inwardly offset pan 18 which protrudes through or sits in a latch opening in a door. The dotted line 19 in FIG. 1 indicates the periphery of a cutout in a door in which the latch is installed. A handle 20, such as a T-shaped handle, is pivotally mounted by wrist pin 22 to a shank 24 so that the handle can be folded down into the pan 18 as shown. The shank 24 is in a hole 38 in pan 18 to intersect perpendicularly the plane of pan 18.

A key operated lock cylinder 26 is mounted in a hole 27 in an expanded portion of peripheral flange 14, secured by a lock cylinder nut 28, with a key hole 30 exposed upon the exterior face of the housing to allow for insertion of a key 31 to operate the lock cylinder. A lock cam 32 is attached to the rotating end of the lock cylinder opposite key hole 30 and positioned for engagement with a U-shaped portion 34 of a lock slide 36.

Figure 4:
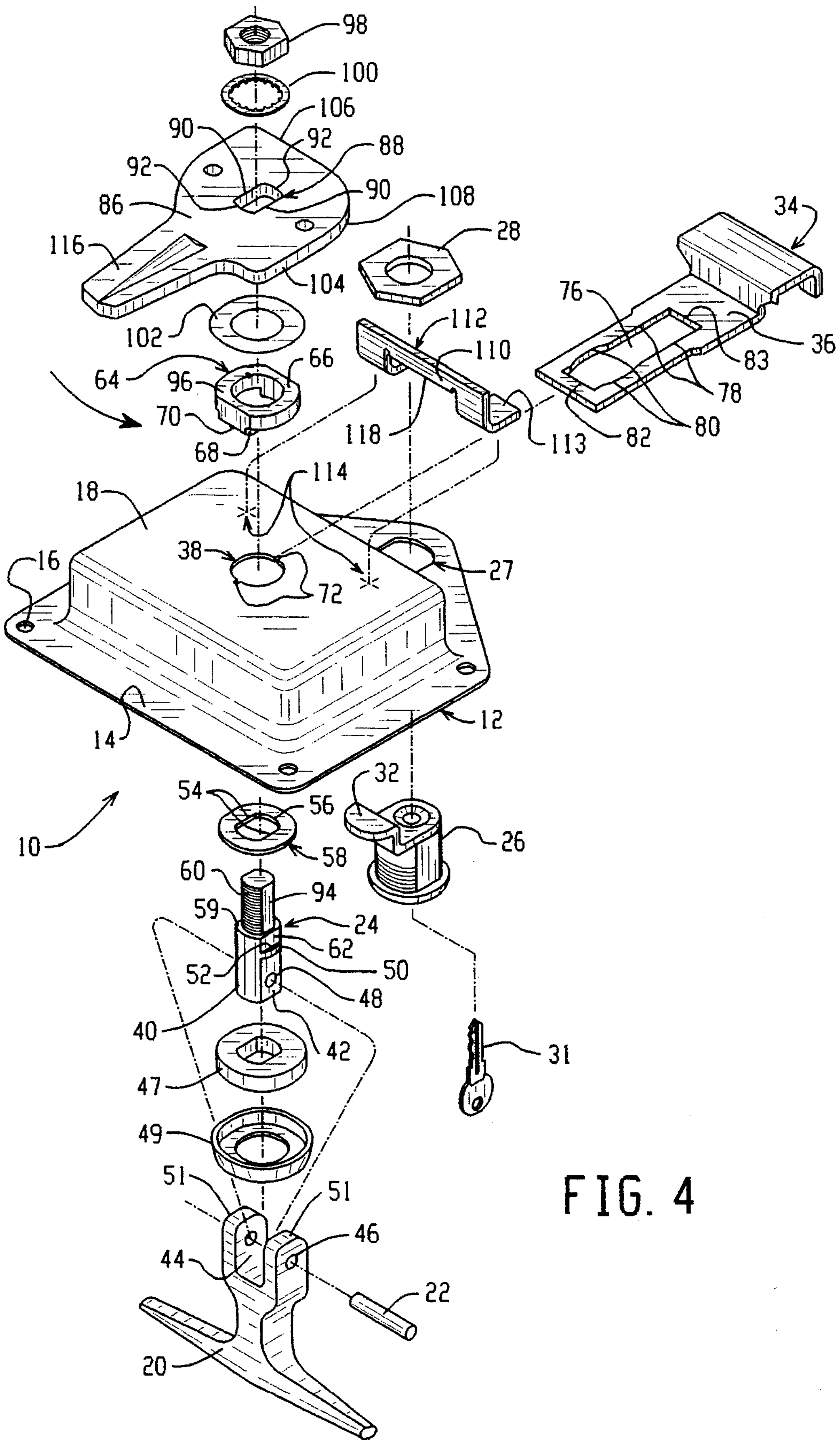
FIG. 4 is an exploded perspective view of a locking embodiment of the latch assembly of the present invention.
Figure 5:
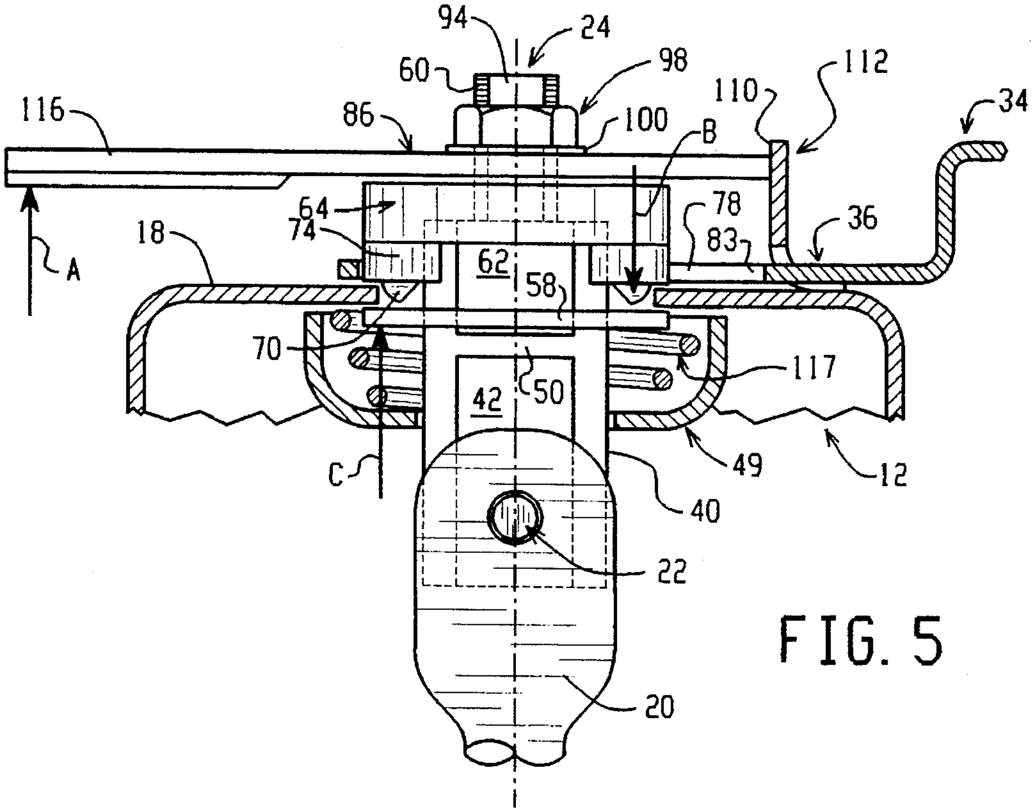
FIG. 5 is an enlarged partial cross-sectional view of the portion of the latch assembly where the shank intersects the housing.

With reference to FIG. 4 in particular, it is shown that shank 24 is mountable through hole 38 in pan 18. Shank 24 includes a generally cylindrical head 40 with outer flats 42 for receiving corresponding flats 44 of handle 20 attached to the shank by insertion of wrist pin 22 through holes 46 in the handle and hole 48 in shank head 40. Flanges 50 extend perpendicularly from flats 42 of the shank. A resilient sealing washer 47, covered by a cap washer 49, are placed about the shank between flanges 50 and hole 48 to bias the cap washer against rounded ends 51 of handle 20, increasing friction in the wrist pin attachment of the handle. In this manner, the handle is securely held in either the operative position of FIG. 4 or the folded position of FIG. 1. As shown in FIG. 5, a spring 117 may be used in substitute for resilient sealing washer 47. However, the resilient sealing washer performs the additional function of a moisture barrier by direct contact with the pan about the periphery of the shank receiving hole in the pan.

Bearing surfaces 52 of flanges 50 overlap straight edges 54 of an orifice 56 of a shank bearing 58 which is placed about the shank head 40 on the exterior side of the pan to prevent axial movement of the portion of the shank head to which the handle is attached through the pan. A threaded portion 60 of the shank extends axially from an end face 59 of head 40. The section of head portion 40 between flanges 50 and threaded portion 60 includes inner flats 62 which extend through the pan 18 to an interior side of the pan a distance at least equal to the thickness of lock slide 36.

Figure 6:
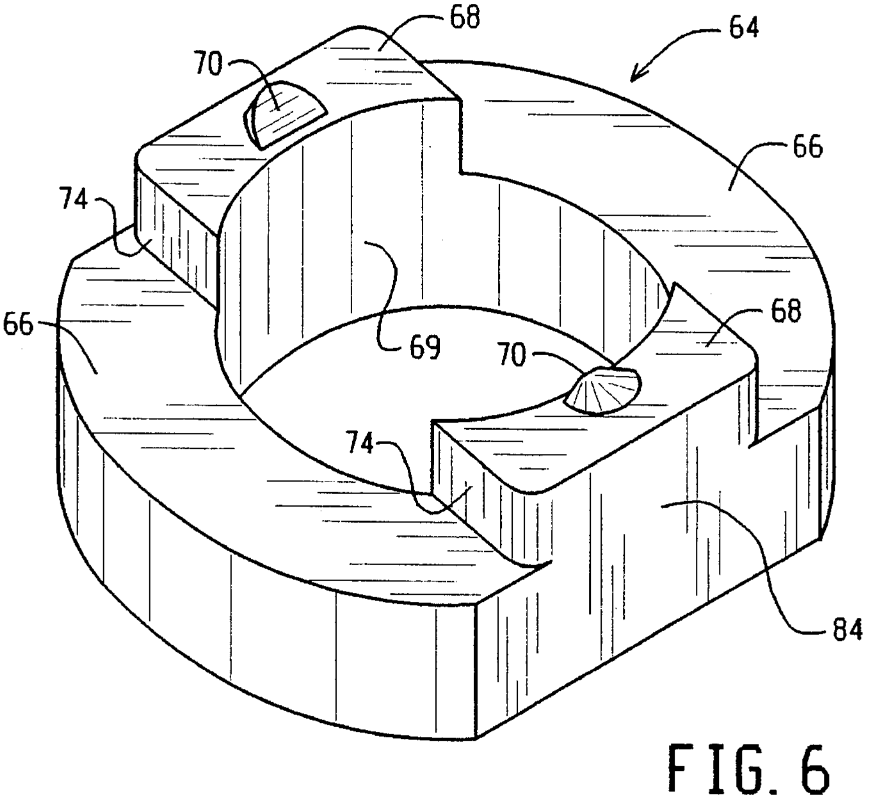
FIG. 6 is a perspective view of a load bearing bushing of the present invention.

As shown in FIG. 5, a bushing 64 is provided about the shank on the interior side of the pan opposite bearing 58 to work in mechanical and structural cooperation with the shank and with the shank bearing to resist forces applied to the shank which would otherwise induce deflection or failure of the latch. As shown in isolated perspective in FIG. 6, bushing 64 includes a hollow generally cylindrical section 66 with lock slide guides 68 extending perpendicular from the plane of cylindrical section 66 in diametric alignment. The perpendicular extent of slide guides 68 from the plane of cylindrical section 66 is at least equal and slightly greater than the thickness of lock slide 36 to allow lock slide 36 to slide freely about slide guides 68, underneath the portions of cylindrical section 66 which extend laterally beyond side walls 74 of slide guides 68. The internal walls 69 of lock slide guides 68 conform to the internal walls of cylindrical section 66. Indexing pins 70 extending from slide guides 68 are positioned for insertion into corresponding indexing holes 72 provided at the periphery of hole 38 in pan 18 as shown in FIG. 4. This indexed positioning of bushing 64 permanently aligns side walls 74 of lock slide guides 68 with the straight edges 78 of a cut-out 76 in lock slide 36 to guide lock slide 36 in a fixed linear orientation upon actuation by cam 32.

The protrusion of inner flats 62 of shank head 40 through the pan into bushing 64 and through cutout 76 of lock slide 36 prevents rotation of the shank when inner flats 62 engage against straight edges 78 of cutout 76. Thus, only upon alignment of an axial center of a rounded cutout 80 (having an open diameter at least equal to the full diameter of shank head 40) with the axis of shank head 40 is the shank allowed to rotate. In this unlocked position of the lock slide 36, the shank head 40 is free to rotate within bushing 64. Rounded cutout 80 is moved into the unlocked position by rotation of cam 32 (by rotation of lock cylinder 26) which actuates lock slide 36 to move linearly in the direction fixed by contact of straight edges 78 with side walls 74 of bushing 64. Precise alignment of rounded cutout 80 with hole 38 is achieved by abutment of a straight end edge 82 of cutout 76 against end wall 84 of bushing 64, defining the end of linear travel of the lock slide to the unlocked position shown in FIG. 2A. Conversely, an opposing end edge 83 of cutout 76 abuts an opposite end wall 84 of bushing 64 to define the end of linear travel of the lock slide 36 into a fully locked position shown in FIG. 2B.

FIG. 5 further illustrates how the assembly of bushing 64 and bearing 58, in connection with bearing surfaces 52 of shank flanges 50 about the point of intersection of the shank with the pan, operates to resist forces applied to the shank to strengthen the shank/housing interface without the use of reinforcing brackets attached to the pan. For example, a force A applied at the point shown to nose 116 of latch arm 86 (such as would result when a latched door is pried) is transferred about the shank by reactive force B onto bushing 64, pan 18 and bearing 58 supported by flange 50. Reactive force C at an opposing point of bearing 58 is entirely opposed by the overlapping section of pan 18. Thus force A is absorbed by the bushing/pan/bearing assembly to minimize deflection of the latch assembly and maintain the position of the shank perpendicular to the plane of the pan. The lock slide is isolated from forces which could bind or jam linear movement. In this manner the pan and the area of intersection of the shank with the pan are structurally reinforced to resist any non-rotary motion of the shank relative to the pan.

Referring again to FIG. 4, a latching arm 86 is attached to threaded portion 60 of shank 24. A latching arm mounting hole 88 has opposed parallel edges 90 and rounded edges 92 to correspond to the cross section of and fit over threaded portion 60 of shank 24 which includes flats 94 which contact opposed parallel edges 90 of the latch arm mounting hole 88 when the shank is rotated, thereby rotating the latching arm 86 in the direction of rotation of the shank. The latching arm 86 is secured to the latch assembly against opposing top face 96 of bushing 64 by a fastener 98 threaded upon shank threaded portion 60. Fastener 98 may be self-retaining or attached in connection with a friction washer 100 placed against the latching arm. A sleeve bearing 102 may be provided between the latching arm and the face 96 of bushing 64 to reduce frictional resistance to rotation of the arm against the bushing.

Figure 7A:
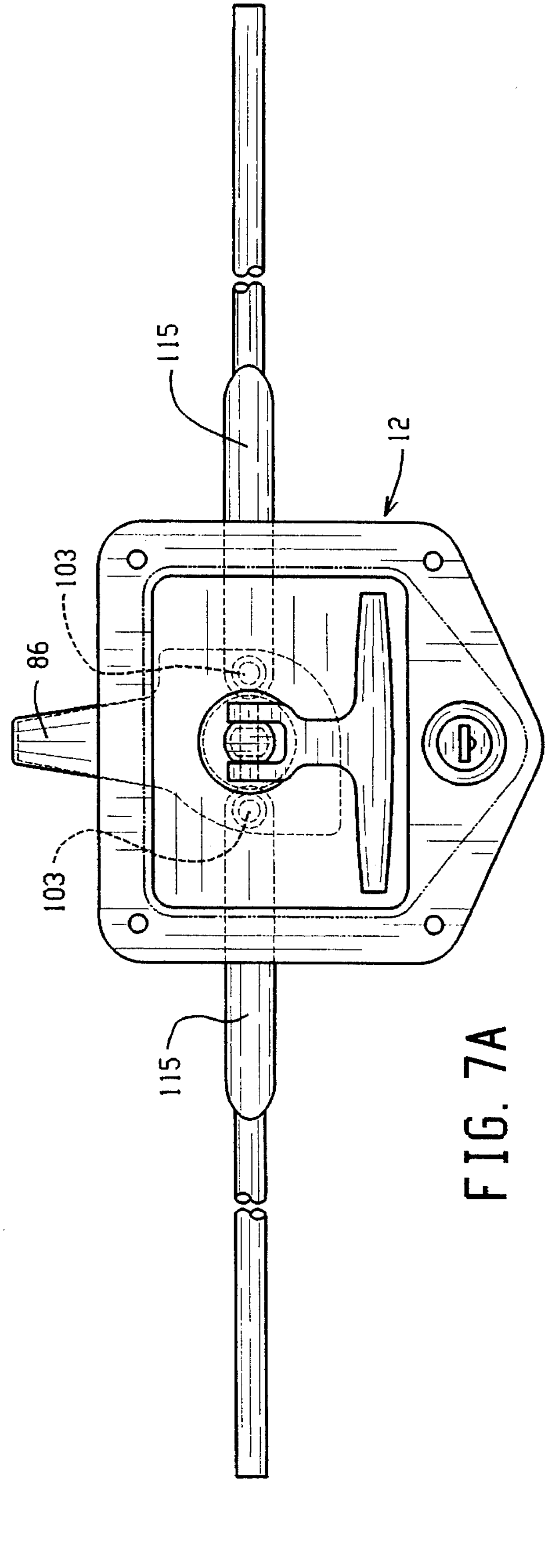
FIGS. 7A and 7B are plan and side views, respectively, of a latch assembly of the present invention which includes remote latch control rods.
Figure 7B:
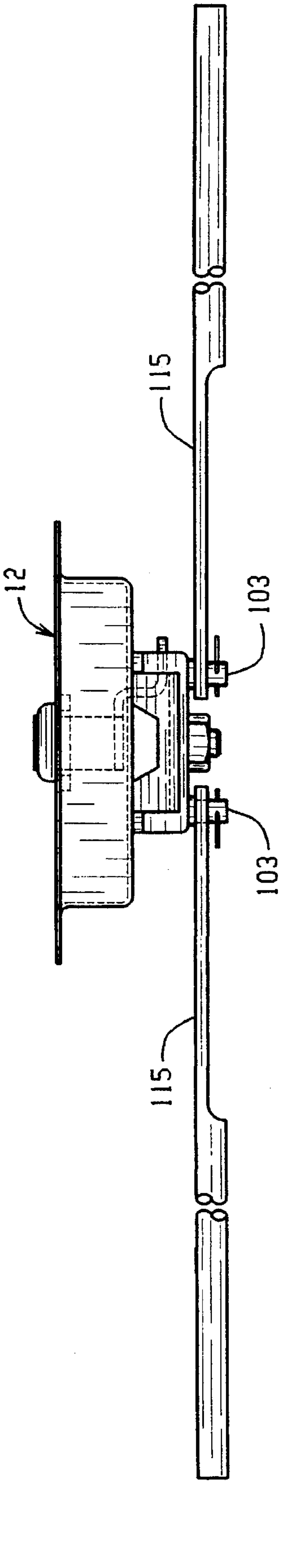

To render the latching arm operative to control latching points remote from the latch assembly, latch control rod connection pins 103 are attached to extend from the arm adjacent the shank for connection to laterally extending latch control rods 115 as shown in FIGS. 7A and 7B. Latch control rods 115 are thus actuated by rotation of the latching arm to control latches at latching points laterally adjacent the latch assembly. The absence of structural support brackets on the interior side of the housing provides for an increased radial range through which remote latch control rods may be attached to extend from the latching arm 86.

The latching arm 86 has straight edges 104 and 106 joined at approximately ninety degrees at a rounded corner 108. In the latched position of the arm, as shown in FIG. 4 and in phantom in FIG. 1, straight edge 106 is in parallel abutment with a vertical face 110 of a latching arm stop 112, secured to the interior side of the pan by attachment of arm stop support struts 113 at points 114 by, for example, spot welds. Latching arm 86 is rotatable in the direction indicated in FIGS. 1 and 4 about rounded corner 108 between straight edges 104 and 106, providing ninety degree rotation and positioning of the arm. Full ninety degree rotation of the arm 86 brings straight edge 104 into parallel abutment with face 110, thereby placing the arm in a fully unlatched position. Arm nose 116 is chamfered to provide smooth engagement and disengagement with a latching surface.

As shown in FIG. 4, vertical face 110 of arm stop 112 includes an opening 118 through which lock slide 36 passes. The attachment of arm stop support struts 113 at points 114 laterally adjacent opposed side edges of lock slide 36 provides structural resistance to torquing of the lock slide induced by rotation of shank head inner flats 62 against straight edges 78 when the lock slide 36 is in the locked position.

Figure 8:
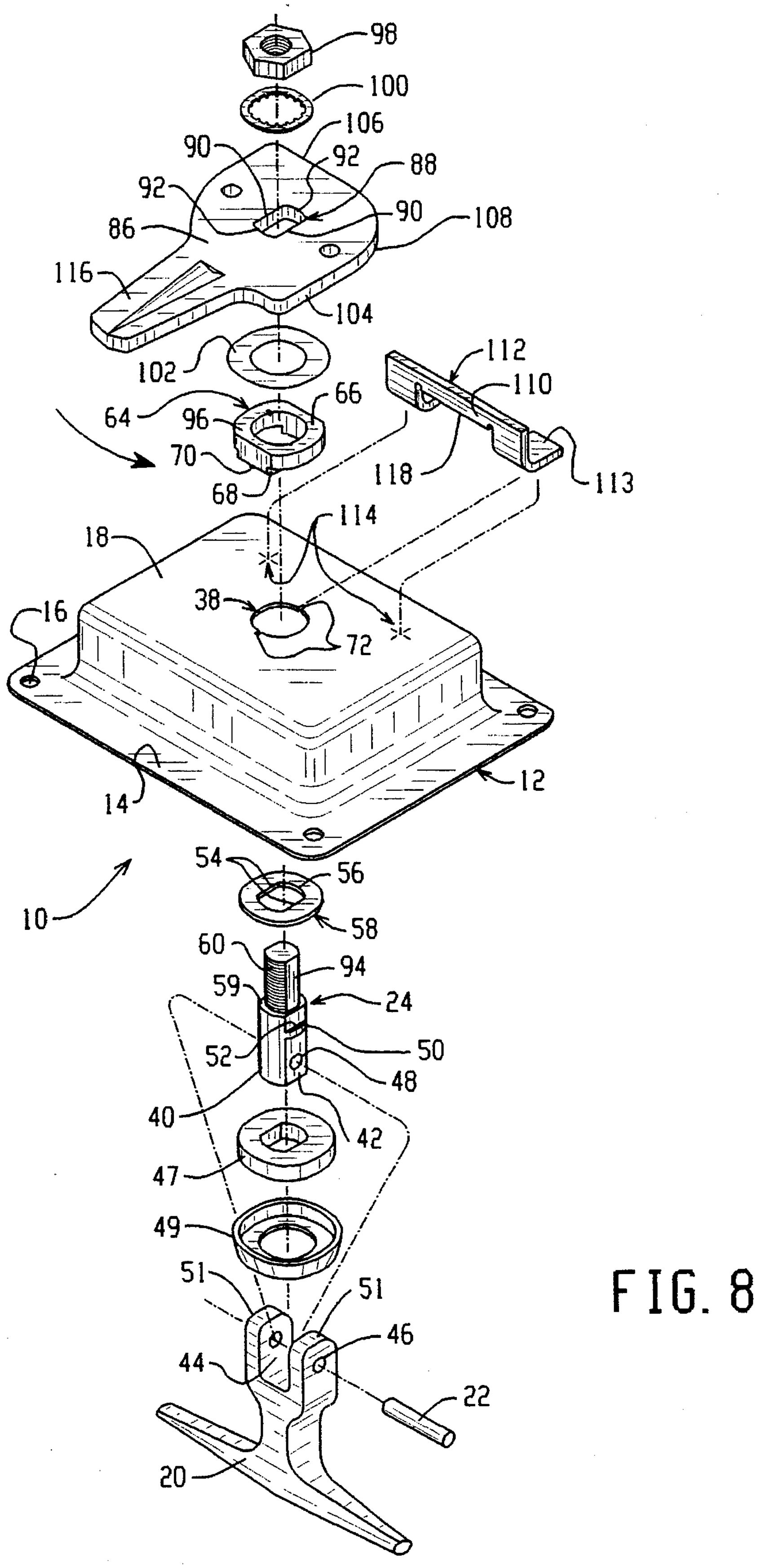
FIG. 8 is an exploded perspective view of a non-locking embodiment of the latch assembly of the present invention.

FIG. 8 illustrates a non-locking embodiment of the latch assembly of the present invention, the construction of which is identical to the latch assembly described above with the exceptions of the absence of an expanded peripheral portion 14 of housing 10, the locking mechanism mounted therein, and the lock slide. In this embodiment, bushing 64 may be of the configuration previously described, or of an alternate configuration that does not have slide guides 68.

The latch assembly as thus disclosed performs multi-point lockable latching with improved structural strength without the use of shank reinforcing brackets welded or otherwise attached to the latch housing. Load bearing pieces about the shank on both sides of the housing make the latch assembly especially strong at the area of intersection of the housing by the shank where failure of the latch is most likely to occur upon application of forces to the shank. The load bearing bushing continuously overlaps the lock slide to provide linear guidance to the lock slide and perform the load transfer functions described with reference to FIG. 5 in locked and unlocked conditions. For example, in a latched (latching arm nose 116 engaging a door frame) but unlocked position (FIG. 2A), a normal force applied to the latching arm nose (force A of FIG. 5.) applies a moment force to the shank absorbed and resisted by the interior and exterior bearings acting in concert. With the lock slide in the locked position (FIG. 2B), the assembly about the shank at the area of intersection with the housing is the same with the exception of the straight edges 78 of the lock slide cutout 76 being adjacent inner flats 62 of the shank. Any torquing of the lock slide by contact of inner flats 62 is resisted both by side walls 74 of the load bearing bushing and the arm stop support struts 113. The lock slide cannot bind or jam because the height of slide guides 68 from the plane of cylindrical portion 66 of bushing 64 is fixed with respect to the interior surface of the pan. The sandwiching of the periphery of pan hole 38 by bushing 64 and shank bearing 58 transfers forces around the lock slide and distributes forces throughout the pan area to prevent movement of the shank relative to the pan by resisting moment forces applied to the shank, and by resisting axial movement of the shank relative to the pan.

Although the invention has been disclosed and described with respect to certain preferred embodiments, certain variations and modifications may occur to those skilled in the art upon reading this specification. Any such variations and modifications are within the purview of the invention notwithstanding the defining limitations of the accompanying claims and equivalents thereof.

What is claimed is:

1. A latch assembly comprising, in combination, a latch housing having an exterior side and an interior side, a rotatable shank intersecting the housing, a handle attached to the shank on the exterior side of the housing, a latch attached to the shank on the interior side of the housing, a load bearing bushing about the shank between the latch and the interior side of the housing, a locking slide on the interior side of the housing having an opening through which the shank passes, the locking slide opening adapted to receive a first portion of the bushing, to slide adjacent the first portion of the bushing, and to slide between a second portion of the bushing and the interior side of the housing.

2. The latch assembly of claim 1 wherein the first portion of the load bearing bushing is in contact with the interior side of the housing in a fixed orientation.

3. The latch assembly of claim 1 wherein the first portion of the bushing received by the opening in the locking slide guides linear movement of the locking slide.

4. The latch assembly of claim 1 wherein a portion of the shank on the exterior side of the housing includes flanges which extend radially outward from a periphery of the shank, and wherein the latch assembly further comprises a shank bearing positionable about the periphery of the shank between the flanges of the shank and the exterior side of the housing, whereby contact of the flanges of the shank with the shank bearing prevents the shank from passing from the exterior side of the housing to the interior side of the housing.

5. The latch assembly of claim 1 further comprising a lock assembly mounted in the housing, the lock assembly comprising a locking cam connected to a lock cylinder, the locking cam engaging a portion of the locking slide on the interior side of the housing, whereby rotation of the lock cylinder rotates the locking cam to move the locking slide along a linear path guided by the first portion of the load bearing bushing received by the locking slide opening.

6. The latch assembly of claim 1 further comprising a latch stop attached to the interior side of the housing, the latch stop having a vertical surface in contact with the latch, whereby rotation of the latch into a latched position brings a portion of the latch into contact with the latch stop, and rotation of the latch into an unlatched position brings another portion of the latch into contact with the latch stop, whereby rotation of the latch beyond latched and unlatched positions is prevented by the latch stop.

7. The latch assembly of claim 6 wherein the latch stop is attached to the interior side of the housing at points lateral to side edges of the locking slide, and wherein the vertical surface of the latch stop straddles the locking slide.

8. A latch comprising, a latch housing adapted to be mounted and having an exterior side and an interior side, a rotatable shank which intersects the latch housing, a latching arm attached to an end of the shank on the interior side of the latch housing, a load bearing bushing about the shank between the latching arm and the interior side of the housing, the load bearing bushing having a generally cylindrical section with a substantially flat top surface disposed generally flush against a surface of the latching arm, and slide guides which extend axially from the cylindrical section of the load bearing bushing for contact with the interior side of the housing, and the shank further having an integrally formed flange which extends from the shank on the exterior side of the housing, a shank bearing about the shank between the shank flange and the exterior side of the housing, the shank flange overlapping a portion of the shank bearing, whereby contact of the shank flange with the shank bearing prevents passage of the shank from the exterior side of the housing to the interior side of the housing, and a handle attached to an end of the shank on the exterior side of the latch housing.

9. A latch assembly comprising, a latch housing having an interior side and exterior side;

a latch shank intersecting the housing;

a latching arm attached to the latch shank on the interior side of the housing;

a load bearing bushing about the shank between the latching arm and the interior side of the housing, the load bearing bushing having a generally cylindrical section with a substantially flat top surface disposed generally flush against a surface of the latching arm, and slide guides which extend axially from the cylindrical section of the load bearing bushing for contact with the interior side of the housing;

a shank bearing disposed about the shank between the exterior side of the housing and a flange which extends from the shank; and a handle attached to the shank on the exterior side of the housing.

10. The latch assembly of claim 9 further comprising a lock mechanism mounted in the housing operative to actuate a lock slide disposed between the load bearing bushing and the interior side of the housing and adapted to slide about the load bearing bushing.

11. The latch assembly of claim 9 wherein the load bearing bushing slide guides which extend from the generally cylindrical section to the interior side of the housing further extend through an oblong opening in the lock slide.

12. The latch assembly of claim 9 wherein the load bearing bushing further comprises indexing points which extend from ends of the slide guides to engage the interior side of the housing.

13. The latch assembly of claim 9 wherein the slide guides of the shank bushing extend from the generally cylindrical section of the shank bushing a distance greater than a thickness dimension of the lock slide.

14. The latch assembly of claim 9 wherein the flange which extends from the shank extends from a generally flat side of the shank.

15. The latch assembly of the claim 9 wherein the shank bearing disposed about the shank includes a flat side which fits over a flat side of the shank whereby the shank bearing is rotatable by rotation of the shank.

* * * * *